United States Patent [19]

Dyke

[11] Patent Number: 4,700,301
[45] Date of Patent: Oct. 13, 1987

[54] METHOD OF AUTOMATICALLY STEERING AGRICULTURAL TYPE VEHICLES

[76] Inventor: Howard L. Dyke, 311 E. Indiana St., Walters, Okla. 73572

[21] Appl. No.: 837,511

[22] Filed: Mar. 7, 1986

Related U.S. Application Data

[63] Continuation-in-part of Ser. No. 547,786, Nov. 2, 1983, abandoned, which is a continuation-in-part of Ser. No. 243,130, Mar. 12, 1981, abandoned.

[51] Int. Cl.$^4$ .............................................. G06F 15/20
[52] U.S. Cl. ..................................... 364/424; 364/456; 180/169; 356/1
[58] Field of Search ............... 364/424, 449, 444, 456; 180/167–169; 342/46, 64; 356/1, 4

[56] References Cited

U.S. PATENT DOCUMENTS

| | | | |
|---|---|---|---|
| 4,225,226 | 9/1980 | Davidson et al. | 364/449 |
| 4,309,758 | 1/1982 | Halsall et al. | 364/424 |
| 4,398,195 | 8/1983 | Dano | 342/46 |
| 4,482,960 | 11/1984 | Pryor | 364/424 |
| 4,566,032 | 1/1986 | Hirooka et al. | 364/424 |
| 4,626,995 | 12/1986 | Lofgren et al. | 364/424 |
| 4,647,784 | 3/1987 | Stephens | 356/1 |

Primary Examiner—Gary Chin

[57] ABSTRACT

A method of automatically steering a motor vehicle on a preprogrammed course by continuously measuring angles between reference points and using a microprocessor to calculate vehicle position and direction of motion. Points along a prescribed course are sequentially retrieved from a memory and the direction to these points are calculated and compared to the present direction of travel. Steering angle is then set to guide the vehicle toward these points.

1 Claim, 13 Drawing Figures

METHOD OF AUTOMATICALLY STEERING AGRICULTURAL TYPE VEHICLES

This is the second continuation-in-part of prior application with the same title, Ser. No. 06/243,130 filed Mar. 12, 1981, abandoned. First continuation-in-part was Ser. No. 06/547,786 filed Nov. 2, 1983, abandoned.

FIELD OF INVENTION

This system steers a motor vehicle on a preprogrammed course in a field allowing automatic or remote control of agricultural equipment.

DISCUSSION OF PRIOR ART

Heretofore tractors have been guided along insulated wires buried in the ground by using electronic sensors to detect the electric field around the wire generated by an alternating current source. The cost of the wire which must be buried below plowing depth has limited this method to very special applications such as orchards. There are systems where a furrow or marker ditch is followed by a wheel which then controls the tractor steering.

There is a method described in U.S. Pat. No. 4,309,758, Jan. 5, 1982 by James R. Halsall which uses three detectors on the vehicle to determine the vehicles distance from each of two light sources by measuring angles and solving a triangle similar to the method used in a camera rangefinder. In a large field this method gives only approximate location and would be very difficult to use while moving over rough ground. Also described is a method where the light from each of two rotating beacons or lasers located at fixed reference points is modulated with a code corresponding to the direction of emission. The light is received, demodulated and decoded on the vehicle to give the bearing of the vehicle from each of the reference points. This is then passed to a microprocessor which figures the vehicle's location using the two angles and the included side of a triangle. The included side being the distance between the reference points. The driverless vehicle is thus autoguided. The problem with this is that determining an accurate location with a rotating beacon requires a very narrow beam of light and a narrow beam will not shine on a distant moving detector long enough to transmit and receive the required information. Also claimed is a fixed nonrotating beacon emitting light simultaneously in many direction with each beam encoded with directional information corresponding to its direction of emission. An accurate location would require vary narrow beams of light which would be vary hard to confine to a narrow enough sector without using coherent laser light. With a moving vehicle there is still a problem of the detector having time to receive the coded information.

Also of importance is U.S. Pat. No. 4,225,226, Sep. 30, 1980 by Richard W. Davidson. It is a guidance aide system for crop spraying aircraft which uses a rotating fan shaped laser beam on the aircraft and a line of three retroreflectors on the ground to find the distance of an aircraft from the line of retroreflectors. This method of finding location is similar to the method used in the preferred embodiment of this invention except only the distance from the vehicle to a line is found. Locating the vehicle using this method with the information given would require finding the distance from each of two nonparallel lines of retroreflectors which determines the equations of two lines each going through the vehicle. Finding the intersection of these two lines would give the coordinates of the vehicles location. Three retroreflectors would be required for each line. If one was common to both lines a total of five retroreflectors would be needed.

OBJECTS OF THE INVENTION

In view of the above, it is the aim of this invention to achieve the following objects singly or in combination: to provide an automatic mechanism capable of steering a vehicle without the use of wires, marks, or ditches; to provide a unique mechanism in which the steering is reliable and precise enough to allow the vehicle to follow the same tracks year after year which reduces ground compaction (a major problem in some agricultural soils) and also conserves fuel and time by reducing overlap; to create a guidance apparatus versatile enough to direct the vehicle around temporary or permanent obstacles such as mud holes or rocks; to create a mechanism capable of guiding a vehicle in a field of any shape through any predetermined pattern; to provide a mechanism sufficiently automatic so that the operator need not ride on the vehicle. Further objects and advantages will become apparent from a consideration of the drawings and ensuing description thereof.

SUMMARY OF THE INVENTION

The vehicle is automatically steered by a microprocessor on a pre-programed course in the following way: A laser emitting a narrow beam of light an an optically aligned directional light detector are mounted on a rotating platform on top of the vehicle. Around the field retroreflectors are positioned at reference points. When the laser light hits the retroreflectors the reflected light is detected and the microprocessor records counts corresponding to the times of the events. From these counts the vehicle's position in the field is computed. By comparing the vehicle's present position with its past position the direction of motion is computed. By comparing the present position with the desired future position taken from a memory the desired direction of motion is found. Finally, by comparing the present direction of motion with the desired direction of motion the steering angle is obtained and the vehicle's wheels positioned to this angle. For small areas where the angles need not be measured with great accuracy the laser is not necessary if the reflectors are replaced with lights and the detector has a very narrow horizontal field of view.

The vehicle's location can also be found by putting lasers rotating at a constant angular velocity at two reference points and locating an all directional light detector on the vehicle and a bidirectional light detector at a third reference point with a way sending a signal to the microprocessor when the laser light is detected. The microprocessor is interrupt to record counts corresponding to the time when the laser light hits these detectors and the vehicles location computed from these counts.

DESCRIPTION OF THE PREFERRED EMBODIMENT

Figure 1:
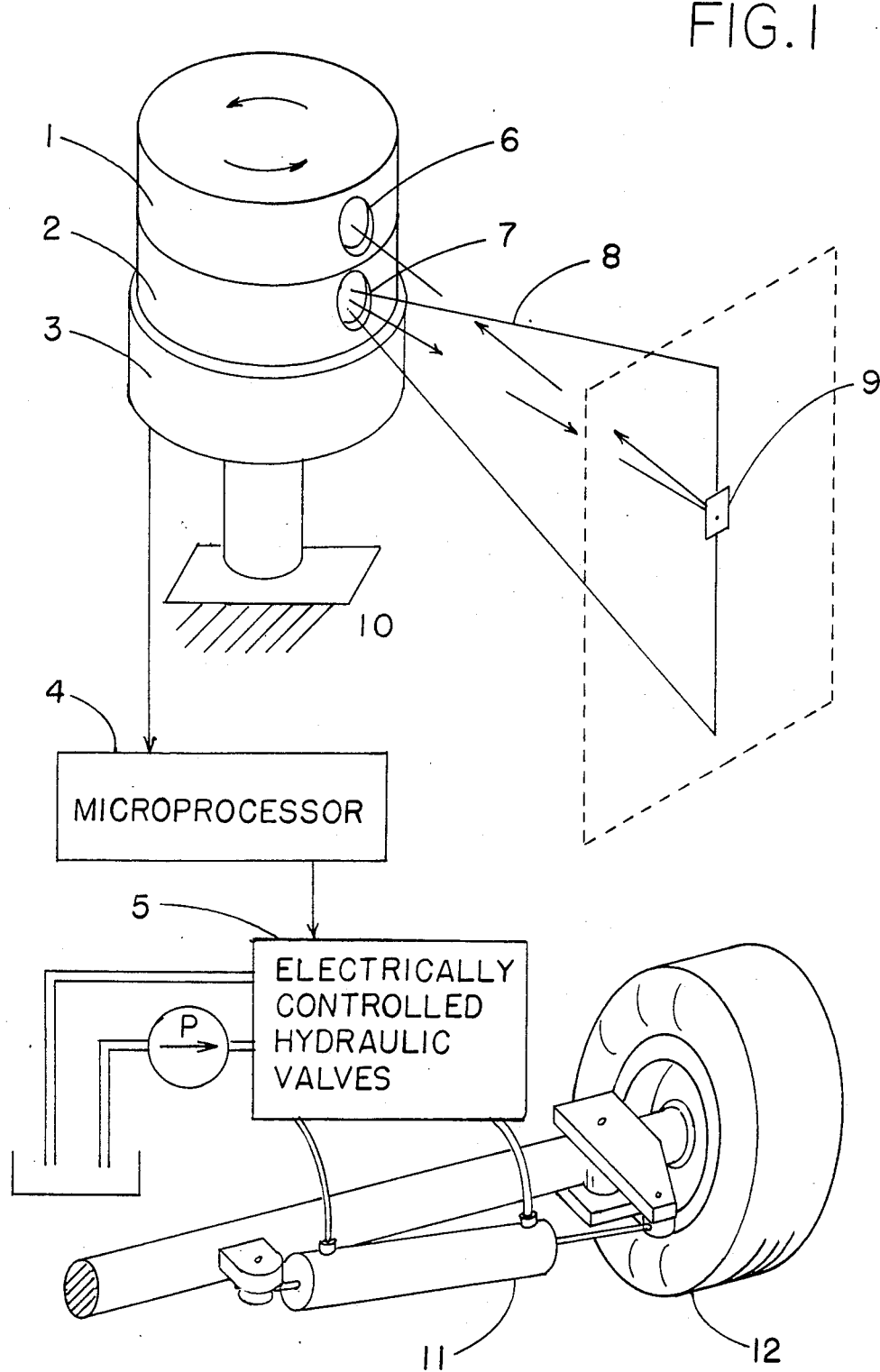
FIG. 1 is a view of the system mounted on the vehicle.

In FIG. 1 a laser transmitter 2 emits a very narrow vertical fan shaped beam of light 8. It uses a gallium arsenide solid state laser (LD-65 made by Laser Diode Laboratories) with the long dimension of the emitting junction positioned vertically. The laser is driven by the circuit shown in RCA application notes AN-4741A. A projector lens 7 collimates the infrared light. The directional light detector 1 uses a RCA C30897 silicon PIN photodiode. Light is collected and focused with a camera lens 6. A fiber optics arrangement transmits the light from a vertical line in the focal plane of the lens to a small spot just in front of the photodiode. This gives the detector a sharp horizontal directivity and not so sharp vertical directivity. This is made by taking optical fibers, aligning one end in a straight line, bunching the other end into a tight bundle, potting them with a hard material and polishing the ends. The output of the photodiode is channeled through an amplifier and a very fast monostable flip-flop conditions the signal for the microprocessor. The laser and light detector are optically aligned and attached to a rotating platform 3 which is mouned on top of the vehicle 10. It contains slip rings, optical coupling or other means of transmitting the detected signal from the light detector 1 to the microprocessor 4. Rotational speed is not critical if the assembly has a high angular momentum relative to the drag and driving torque so that speed variations within one revolution are negligible. The driving mechanism is very loosely coupled so that errors are not introduced as the vehicle turns. This is achieved by using a very low friction drive. An improvement would be a variable torque direct drive motor or a motor with a hysteresis or eddy-current clutch which would supply only enough torque to maintain rotational speed. The torque required would be controlled by the microprocessor using the counts (continuously being recorded to determine location) to calculate the exact rotational speed. Mounting the apparatus in a gimbal would help minimize the error caused by the tilt of the vehicle.

Microprocessor 4 includes a continuously running counter which counts crystal stabilized clock pulses and has associated with it a memory containing the cooredinates of points along the vehicle's prescribed path. This memory can be magnetic tape, magnetic disc, solid state memory, bubble memory or other memory device. An RCA CDP 1802 central processor with a MM57109 number oriented microprocessor and LS7030 8 decade 5 mhz counter was used.

Electrically controlled hydraulic valves 5 control the hydraulic pressure on the cylinder 11 determining the angular position of the wheels 12. Simple solenoid type valves are used with the angle of the wheels feedback to the microprocessor.

Retroreflectors 9 are positioned at reference points to reflect the laser light back to the light detector. The distance determines the quality of the retroreflectors required. An alternative to the reflectors would be the use of laser light detectors located at the reference points which would trigger a strobe light, radio transmitter, or other means of transmitting the detected signal to the microprocessor.

Figure 2:
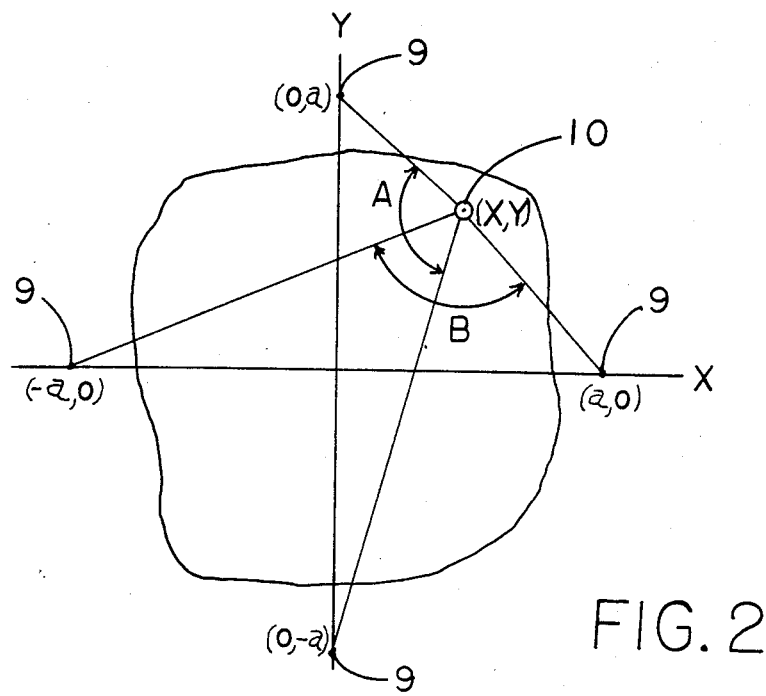
FIG. 2 shows a cartesian coordinate system superimposed over a field. Angles are measured between fixed reference points at the vehicle.
Figure 3:
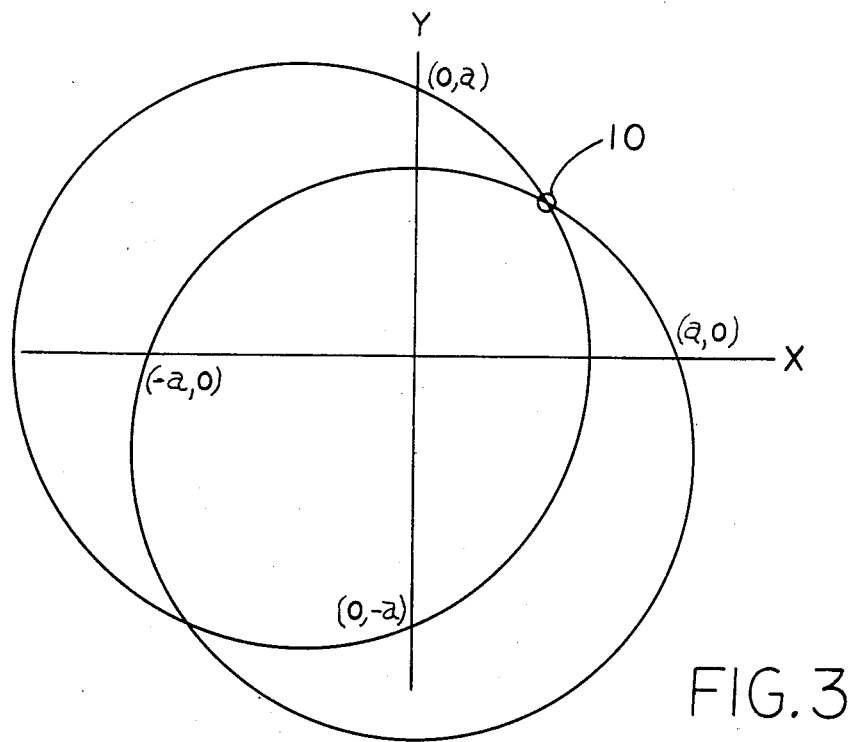
FIG. 3 shows the same coordinate system as FIG. 2 with circles drawn to illustrate how the vehicle's location is found.
Figure 4:
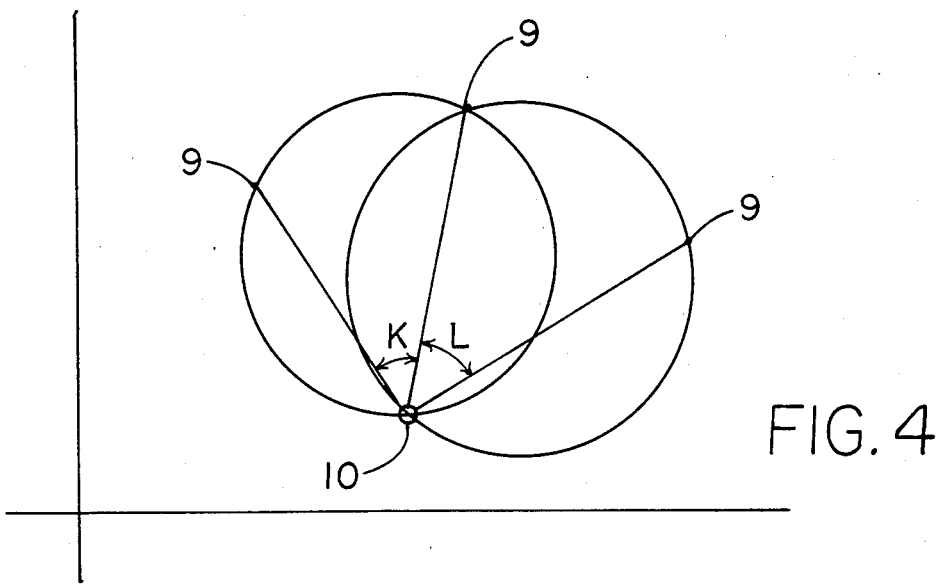
FIG. 4 shows a variation using only 3 reference points.
Figure 5:
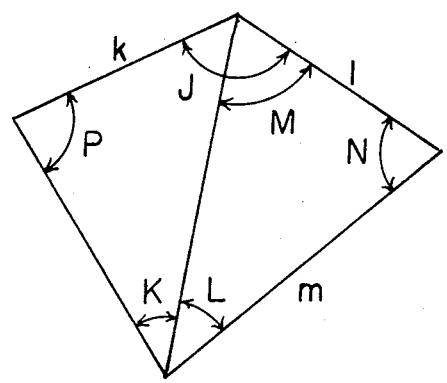
FIG. 5 is the same arrangement as FIG. 4 with more labeling.
Figure 6:
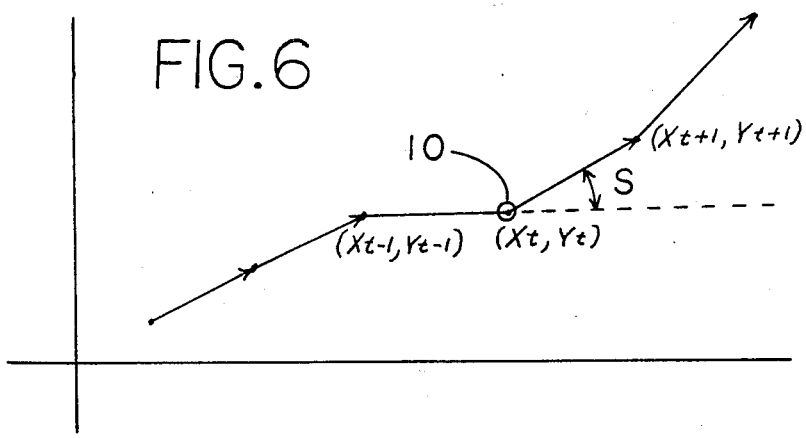
FIG. 6 shows the vehicle's location along its path at various times.
Figure 7:
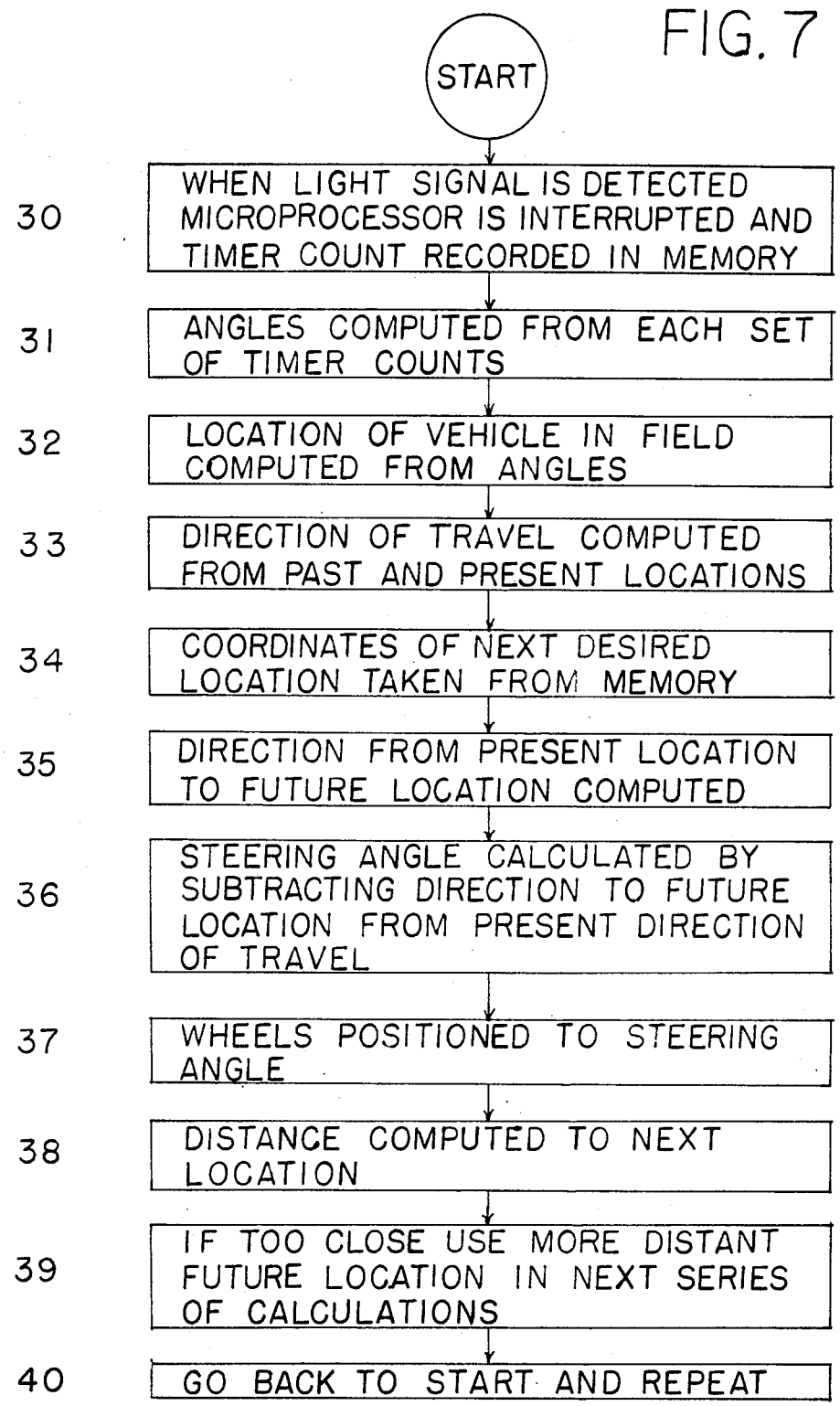
FIG. 7 is a flow chart of the microprocessor program.

FIG. 2 shows a cartesian coordinate system superimposed over a field. The reflectors 9 are at fixed reference points which are on the axis and equidistance from the origin. Angles A and B are the angles between reflectors measured at the vehicle 10. FIG. 3 show the same coordinate system as FIG. 2 with circles drawn to illustrate how the vehicle's location is found. Vehicle 10 is at the intersection of these circles. A different arrangement using only three reference points is shown in FIG. 4 and FIG. 5. Retroreflectors 9 are located at fixed reference points. The vehicle 10 is at a point calculated from angles K and L. The vehicle's path is shown in FIG. 6. The vehicle 10 is located at point (xt,yt) at the time when its location is computed. Points to the right such as (xt+1,yt+1) are points along the vehicle's preprogrammed path taken from the memory. Points to the left such as (xt−1,yt−1) are locations of the vehicle computed by the microprocessor prior to the present time t. Angle s is the steering angle required at time t to guide the vehicle along the path. FIG. 7 is a flow chart of the process in the read-only memory of the microprocessor.

OPERATION OF PREFERRED EMBODIMENT

The system functions as follows: Angles between reflectors positioned outside the field are calculated by the microprocessor from the time taken by the horizontally rotating laser to turn through the angles between them. The location of the vehicle in the field is calculated from these angles. Coordinates of the nest desired future location is taken from the memory and the vehicle steered toward this point.

The rotating laser 2 in FIG. 1 emits a very rapidly pulsed beam of light 8. When it is pointed toward a reflector 9, part of the light is reflected back to the light detector 1. Each time reflected light is first detected, the microprocessor is interrupted to record the count at that time (program STEP 30 of FIG. 7). The angles A and B between reference points are computed in STEP 31. Angle A is figured from the count $C_1$ at the first reference point and count $C_2$ at the other reference point and count $C_3$ which is the count at the first reference point on the next revolution of the laser. The angle in degrees would be expressed mathematically as follows:

$$A = \frac{(C_2 - C_1)360}{(C_3 - C_1)}$$

Angle B is figured in a similar manner.

In STEP 32 the location of the vehicle in the field is figured from angles A and B of FIG. 2. The circles in FIG. 3 are found from an extension of the trigonometric law of sines which says that for any triangle any side divided by the sine of its opposite angle is equal to the diameter of the circumscribed circle. Referring to FIG. 2, since one side (the distance between reference points) and the opposite angle (figured from the recorded counts in STEP 31) are known, the equation of the circle on which the vehicle and reference points are located, can be found. Another circle is found from the other angle and reference points. The location of the vehicle in the field (xt,yt) is at the intersection of these two circles. Using the quadratic formula y is obtained from the equation $$\left(\frac{\tan^2 A}{\tan^2 B} + 1\right) y^2 - \frac{2a}{\tan B} y - a^2 = 0$$

and x is found from y using the linear equation.

$$x = \frac{\tan A}{\tan B} y$$

for points below the X axis the other root of the quadratic equation is used. Only one root is located in the field if the field is contained within the circle determined by the reference points. Points on the X axis require a simple subroutine. With the MM57109 this calculation takes several seconds but with the AM 9511 number-oriented or similar newer microprocessors these operations should take less than two one hundredths of a second. Location of vehicle 10 can also be found using only three retroreflectors 9 as shown in FIG. 4. Care must be taken in placing the retroreflectors because as the circles become more concentric the accuracy of the calculated vehicle's location deteriorates. It is calculated as follows: from FIG. 5.

Using the law of sines gives the equation $$\frac{k \sin P}{\sin K} = \frac{l \sin N}{\sin L} = n$$

this can be rewritten as $$\frac{k \sin L}{l \sin K} = \frac{\sin N}{\sin P}$$

which is defined as tan X. If P+N is greater than 180 degrees using the equation $$\tan \frac{P - N}{2} = (X - 45°)\tan \frac{P + N}{2}$$

or if P+N is less than 180 degrees using the equation $$\tan \frac{N - P}{2} = (X - 45°)\tan \frac{P + N}{2}$$

N−P can be found. Since N+P is shown (360 degrees−K−L−J) angle N is determined and distance n is found using the law of sines. Angle M is 180 degrees minus N minus L. Since this location is relative to the reference points a transformation may be needed to get location in a cartesian coordinate system.

Direction of travel STEP 33 is found by taking the Arc tan of the slope of the line through the present and past location. Coordinates of the next desired location are read from memory in STEP 34 and the direction to this location figured the same way in step 35.

Steering angle S is found in STEP 36 by subtracting the direction to the next location from the direction of travel from the past location. It is expressed mathematically as:

$$S = \text{Arc tan} \frac{y_{t+1} - y_t}{x_{t+1} - x_t} - \text{Arc tan} \frac{y_t - y_{t-1}}{x_t - x_{t-1}}$$

or written another way for faster computation.

$$S = \text{Arc tan} \frac{(y_{t+1} - y_t)(x_t - x_{t-1}) - (y_t - y_{t-1})(x_{t+1} - x_t)}{(x_{t+1} - x_t)(x_t - x_{t-1}) + (y_t - y_{t-1})(y_{t+1} - y_t)}$$

It is defined as the angle between the instantaneous straight line direction of motion of the vehicle and the desired direction of motion. If slide slip is present this will be different than the angle of the wheels to the longitudinal axis of the vehicle but the error is self correcting. A positive sign steers to the right. A negative sign steers to the left. STEP 37 passes the desired steering angle to the hydraulic control valve which positions the wheels or direction controlling mechanism of the vehicle to achieve the desired direction of motion.

STEP 38 computes the distance from the present location to the next desired location.

$$\text{distance} = \sqrt{(x_{t+1} - x_t)^2 + (y_{t+1} - y_t)^2}$$

STEP 39 compares this distance to a number which is dependent upon the speed of the vehicle. If the distance is less than this number, a more distant point is retrieved from the memory in the next series of calculations. STEP 40 repeats all calculations for each new set of counts.

In small fields or areas such as lawns where angles need not be measured so precisely the laser transmitter 2 of FIG. 1 is not needed, if the reflectors 9 in FIGS. 1, 2, and 4 are replaced by light sources which can be ordinary light bulbs. All other elements and all calculations remain the same as those just described. Small changes in the light detector 1 will make it better suited for this mode of operation. Decreasing the aperture of the camera lens 6 will increase the depth of focus causing the image of the light source to stay more nearly the same size as the vehicle moves around. The photocell could be chosen to match the light spectrum of the new light source.

DESCRIPTION OF ALTERNATE ARRANGEMENT

Figure 8:
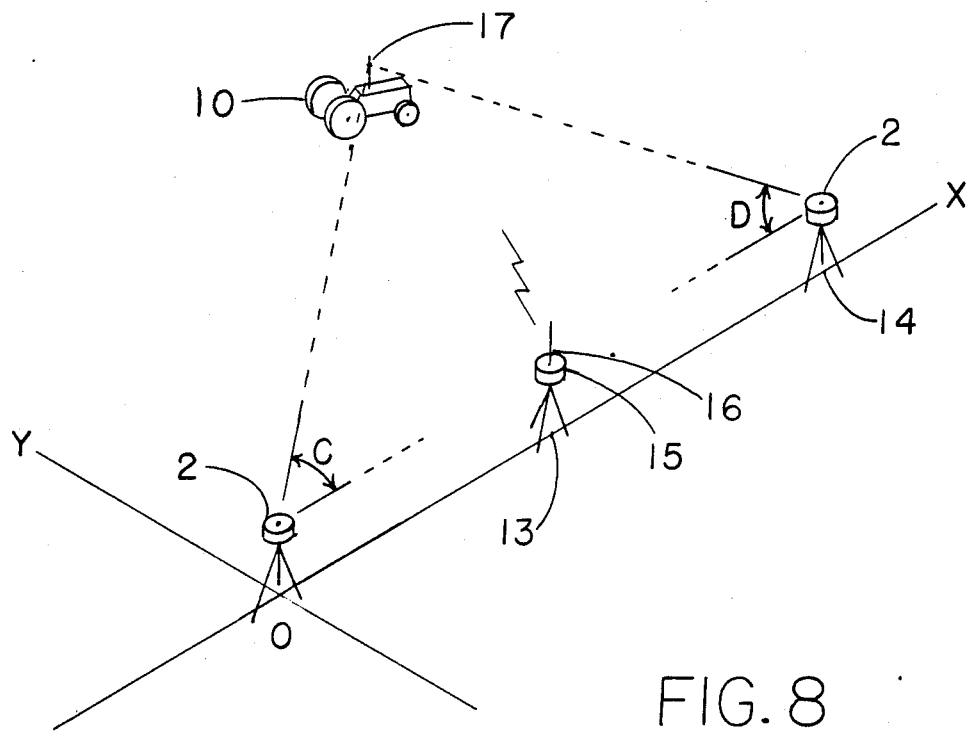
FIG. 8 shows a different arrangement with the field in the first quadrant of a superimposed coordinate system.
Figure 11:
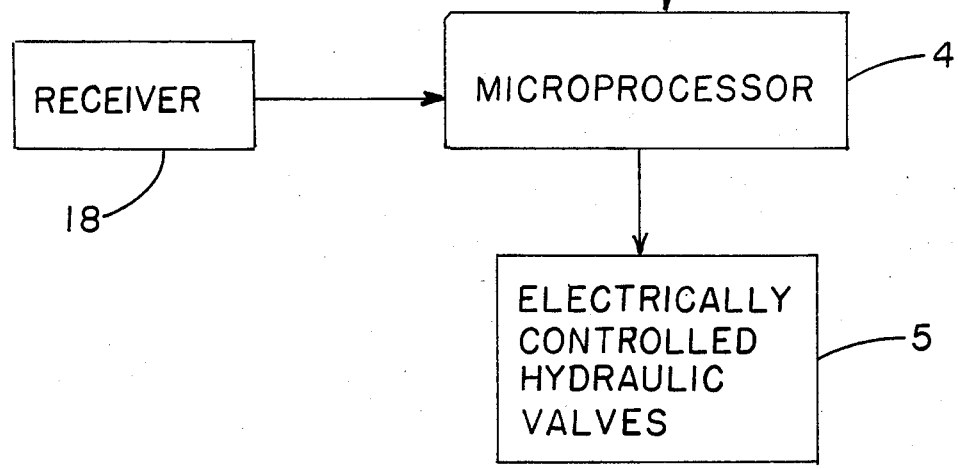
FIG. 11 shows the system on the vehicle for the arrangement shown in FIG. 8.

FIG. 8 is a different arrangement using the same parts with the addition of an all directional light detector 17 as shown in FIG. 11 and with the field in the first quadrant of the coordinate system. Lasers 2 are mounted on tripods and rotating at a constant angular velocity. They are located at the origin O and on the X axis at point 14. An all directional light detector 17 is located on the vehicle 10. A bi-directional light detector 15 with a radio transmitter 16 to transmit the detected signal to the vehicle is located at point 13.

Figure 9:
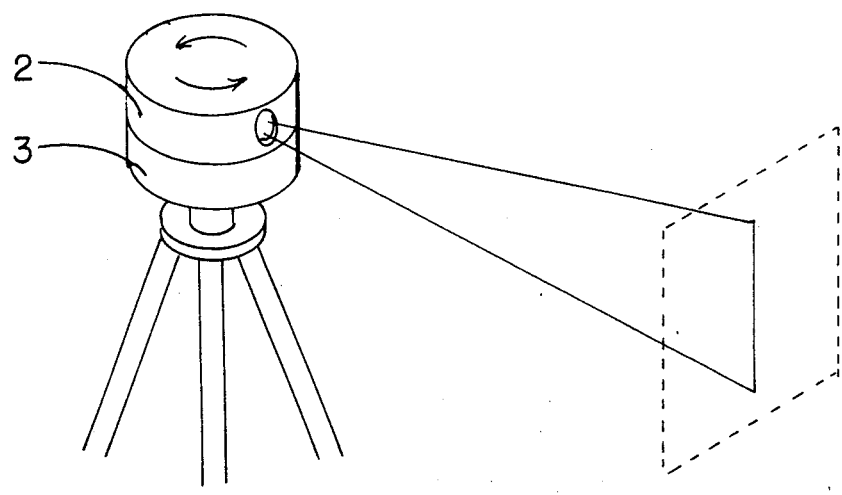
FIG. 9 shows a rotating laser.

FIG. 9 shows the rotating laser 2 used in the arrangement of FIG. 8. It is rotated by a motor 3 turning at a constant angular velocity. They are identical to the one mounted on the vehicle in the FIG. 1 and previously described. Pulsed solid state lasers have a limited duty cycle, the percentage of the time it can operate without burning up, which means the pulse width is chosen as narrow as possible so that the repetition rate can be as fast as possible. The scan rate is then chosen so as to not skip any area.

Figure 10:
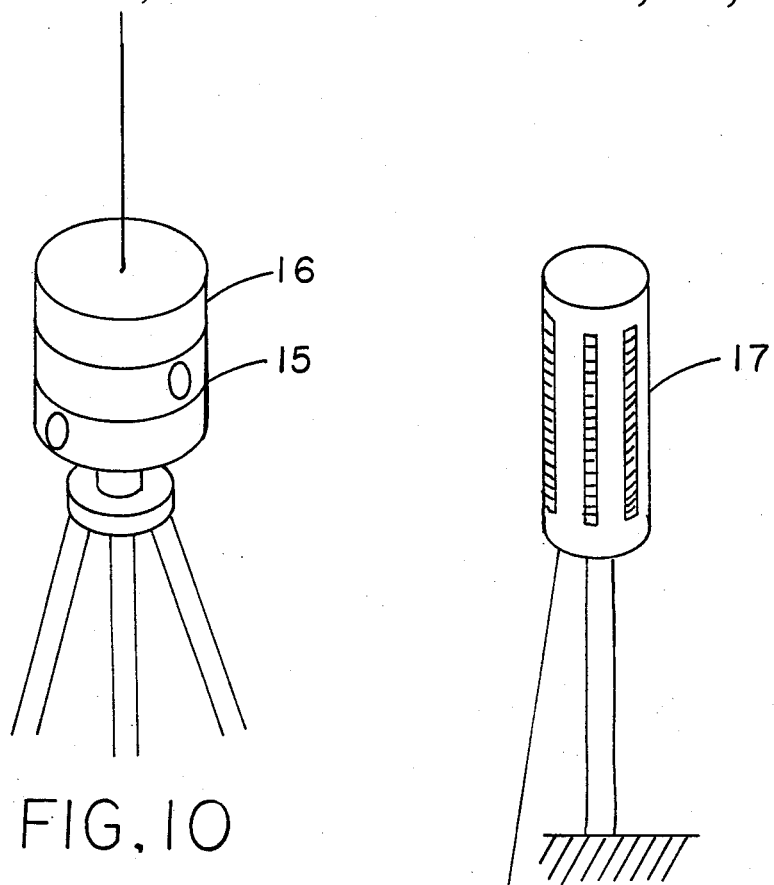
FIG. 10 shows a laser detector and a transmitter.

FIG. 10 shows a light detector 15 which is located at point 13 of FIG. 8 and is identical to the one mounted on the vehicle in FIG. 1. There is one light detector for each laser and they can be independently rotated about their vertical axis to align them. Radio transmitter 16 transmits the detected signal to the receiver on the vehicle. This signal is frequency modulated so that the receiver can distinguish between the two lasers.

FIG. 11 shows the all directional detector 17 with the system components located on the vehicle of FIG. 8. For detecting the pulsed lasers with the fan shaped beam the photocells PIN photodiodes must be physically very small in order to have a fast enough response time to detect the short pulses of 10 nano-seconds. They must also be very sensitive for use without a lens. There is a relatively new polymeric piezoelectric film polyvinylidene fluoride called KYNAR Piezo Film made by Pennwalt Corporation, King of Prussia, Pa., which can be used for infra-red laser detection and might be a good detector for this application. The radio receiver 18 receives the signal sent by the light detector located at point 13 of FIG. 8 and passes it on to the microprocessor 4. The rest of the system is the same as that shown in FIG. 1 with the microprocessor controlling the hydraulic valves which positions the wheel to the right angle to guide the vehicle.

Figure 12:
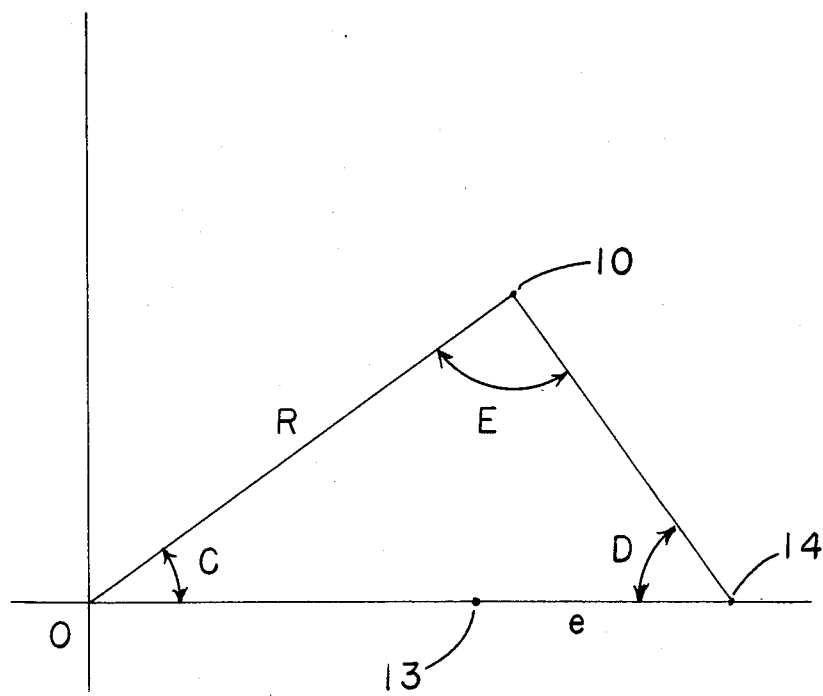
FIG. 12 is the same coordinate system as in FIG. 8 showing how the vehicle's location is found.

FIG. 12 is the same arrangement as in FIG. 8 showing how the vehicle's location is found. Angle C is the angle between fixed reference point 13 and vehicle 10 measured at the origin. Angle D is the angle between fixed reference point 13 and the vehicle measured from point 14. The distance e is the distance from the origin to point 14.

Figure 13:
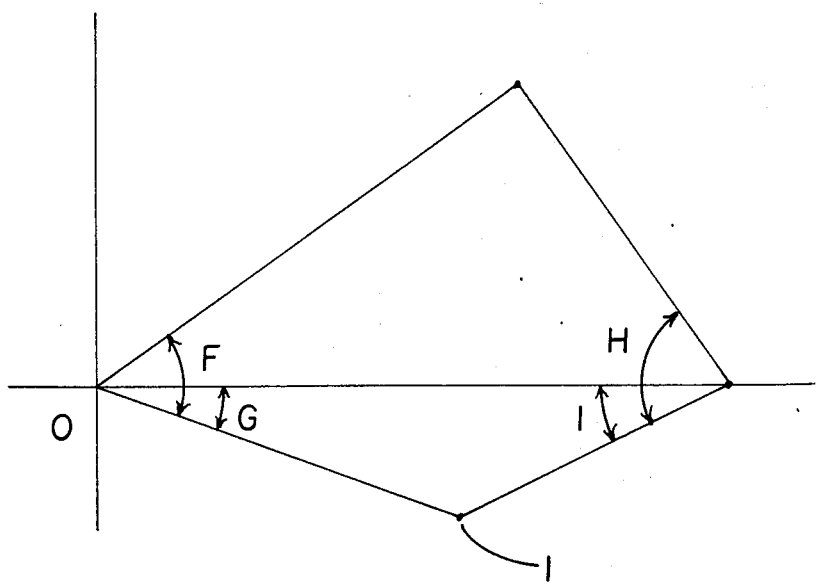
FIG. 13 is a slight variation of FIG. 12 with the fixed light detector located off the x axis.

FIG. 13 is a slight variation of FIG. 8 and FIG. 12 with the light detectors 1 located off the line determined by the two lasers. This allows the reference points to be located at convenient places not restricted to a straight line. The calculations are the same as in FIG. 12 if F-G is substituted for C and H-I for D.

For nearly level fields this arrangement can be assembled using commerically available lasers and light detectors which are used in land leveling. These can be purchased from several sources including Laserplane Corporation, Dayton, Ohio. They use helium neon lasers which continuously emit only a spot of light. Because they are continuously emitting they can turn must faster than pulsed lasers without missing any area. Two lasers are required and if they are leveled and set at slightly different elevations, the detectors can use this difference to distinguish between them. One laser is set at the origin and one at point 14 of FIG. 12. Two detectors would be needed at point 13 of FIG. 12. One allocated for each laser and set at the corresponding elevation. They are connected to a radio transmitter to signal the microprocessor when the laser light is detected. Also two detectors are required on the vehicle located at point 10 of FIG. 12, one for each laser. Normally for land levelling, one set of multiple detectors used to control a cutting blade and is automatically positioned up and down to follow and interrupt the laser light. These same detectors and positioning mechanism can be used to detect the laser light at the vehicle. Another set of all directional detectors can be attached to the same positioning mechanism with spacing between the two detectors corresponding to the difference in elevation of the laser transmitters. These detectors need to be wired to the microprocessor so the counts corresponding to the time when the laser light is detected can be recorded.

OPERATION OF ALTERNATE ARRANGEMENT

In the alternate arrangement of FIG. 8 when light from the rotating laser at the origin is detected by the bidirectional light detector at point 13 a signal is transmitted to the microprocessor to record the count ($C_{1C}$) of the continuously running timer corresponding to that time. When light from the same laser is detected at the vehicle 10 the corresponding count ($C_{2C}$) is also recorded. On the next revolution of the laser this is repeated with count ($C_{3C}$) corresponding to the time when laser light hits the bidirectional light detector. Angle C is then figured the same way as angle A was in the preferred embodiment. Angle C in degrees is expressed as follows:

$$C = \frac{(C_{2C} - C_{1C})360}{(C_{3C} - C_{1C})}$$

Angle D is figured in the same way. $C_{1D}$ is the count when the light from the laser at D hits the detector at 13 and count $C_{2D}$ corresponds to the time when the laser at D hits the detector on the vehicle at point 10 and $C_{3D}$ is the count corresponding to the count $C_{1D}$ on the next time around. Angle D would be:

$$D = \frac{(C_{2D} - C_{1D})360}{(C_{3D} - C_{1D})}$$

The distance e from the origin O to the reference point 14 is known. The distance R from the origin O to the vehicle 10 is found using the law of sines which gives the vehicle's location in polar coordinates. It would be:

$$R = \frac{e \sin D}{\sin (C + D)} \quad \theta = C$$

A polar to cartesian coordinate transformation gives the vehicles location corresponding to step 32 of FIG. 7. All other calculations are the same as in the first arrangement. Repeating with reference to FIG. 6, direction of travel STEP 33 is found by taking the Arc tan of the slope of the line through the present and past location. Coordinates of the next desired location are read from memory in STEP 34 and the direction to this location figured the same way in step 35.

Steering angle S is found in STEP 36 by subtracting the direction to the next location from the direction of travel from the past location. It is expressed mathematically as:

$$S = \text{Arc tan} \frac{y_{t+1} - y_t}{x_{t+1} - x_t} - \text{Arc tan} \frac{y_t - y_{t-1}}{x_t - x_{t-1}}$$

or written another way for faster computation.

$$S = \text{Arc tan} \frac{(y_{t+1} - y_t)(x_t - x_{t-1}) - (y_t - y_{t-1})(x_{t+1} - x_t)}{(x_{t+1} - x_t)(x_t - x_{t-1}) + (y_t - y_{t-1})(y_{t+1} - y_t)}$$

It is defined as the angle between the instantaneous straight line direction of motion of the vehicle and the desired direction of motion. If slide slip is present this will be different than the angle of the wheels to the longitudinal axis of the vehicle but the error is self correcting. A positive sign steers to the right. A negative sign steers to the left. STEP 37 passes the desired steering angle to the hydraulic control valve which positions the wheels or direction controlling mechanism of the vehicle to achieve the desired direction of motion.

STEP 38 computes the distance from the present location to the next desired location:

$$\text{distance} = \sqrt{(x_{t+1} - x_t)^2 + (y_{t+1} - y_t)^2}$$

STEP 39 compares this distance to a number which is dependent upon the speed of the vehicle. If the distance is less than this number, a more distant point is retrieved from the memory in the next series of calculations. STEP 40 repeats all calculations for each new set of counts.

Many other variations and refinements are possible. Any arrangement of reference points can be used if the microprocessor is programed correspondingly. If unwanted signals are a problem, the detector and laser can be gated or turned on only at the anticipated time by the microprocessor. Pulse width discriminators, frequency discriminators, and optical filters will provide additional selectivity. Errors due to the vehicle's motion can be decreased by a more elaborate microprocessor program. Double or triple reflectors or light sources separated by small distances would provide positive identification of the different reference points. Compass readings can also be used to identify points and provide a less accurate location as a backup for times when the laser light is interrupted. With the advance in microwave technology, it may be possible to measure the angles with sufficient accuracy using radiation in the 30 to 300 gigahertz range therefore laser beam is defined for this application as any electromagnetic radiation which can be directed into a narrow enough beam. Points along the desired path can be recorded in the memory several ways. Driving the vehicle over the field and using the microprocessor to record them, using a map and manually or automatically recording the points, driving the vehicle around the field recording the points on the first round and using the microprocessor to figure the remainder of the points from the previous round or adjacent path. Because of the many different arrangements the scope of the invention should be determined not only by the embodiments illustrated but by the appended claims and their legal equivalents.

What is claimed is:

1. A method of automatically steering a vehicle which heretofore consisted of:

(a) location at fixed reference points beacons or rotating lasers in which the emitted light is modulated with encoded directional information corresponding to the instantaneous direction of emission, (b) receiving the modulated light with two or more detectors located on said vehicle, (c) demodulating the said modulated light with a demodulator to obtain the bearing of said vehicle from said reference points, (d) supplying said bearing from the said demodulator and said directional information from said detectors to data processing means located in said vehicle, to provide location and heading of said vehicle, (e) retrieving prerecorded coordinates of desired future location of said vehicle from a memory, (f) supplying said coordinates to said data processing means, (g) using said data processing means to calculate the steering angle based on the said bearing and directional information from said detectors and prerecorded coordinates necessary to guide said vehicle to said future location, (h) positioning the wheels or guiding mechanism of said vehicle based on said calculated steering angle, and (i) repeating the above steps, wherein the improvement consists of using the following simpler and more accurate method in determining said vehicle's location: replacing said beacons or lasers in which the light is modulated with said encoded directional information, with lasers rotating at a constant angular velocity about a vertical axis at each of two reference points, installing an all directional light detector on said vehicle and placing at a third reference point a bidirectional light detector with a means for sending a signal to said vehicle when laser light emitted from said rotating lasers is detected, recording in data processing memory a first count $C_{1C}$ representative of the time when light from the laser at first reference point hits said bidirectional light detector and recording in said data processing memory a second count $C_{2C}$ representative of the time when light from the said laser at first reference point hits said all directional light detector and recording in said data processing memory a third count $C_{3C}$ representative of the time when light from the said laser at first reference point hits said bidirectional light detector on the next time around and recording in said data processing memory a fourth count $C_{1D}$ representative of the time when light from the laser at second reference point hits said bidirectional light detector and recording in said data processing memory a fifth count $C_{2D}$ representative of the time when light from said laser at second reference point hits said all directional light detector and recording in said data processing memory a sixth count $C_{3D}$ representative of the time when light from the said laser at second reference point hits bidirectional light detector on the next time around and supplying all of said counts to said data processing means to determine location and direction of motion of said vehicle.

* * * * *